US008985532B2

(12) United States Patent
Chirpich et al.

(10) Patent No.: US 8,985,532 B2
(45) Date of Patent: Mar. 24, 2015

(54) MODULAR BOOM MOUNTING SYSTEM FOR AGRICULTURE SPRAYER

(71) Applicant: AGCO Corporation, Duluth, GA (US)

(72) Inventors: Kyle Chirpich, Jackson, MN (US); Glen D. Kroese, Jackson, MN (US)

(73) Assignee: AGCO Corporation, Duluth, GA (US)

( * ) Notice: Subject to any disclaimer, the term of this patent is extended or adjusted under 35 U.S.C. 154(b) by 162 days.

(21) Appl. No.: 13/654,487

(22) Filed: Oct. 18, 2012

(65) Prior Publication Data

US 2013/0099069 A1 Apr. 25, 2013

Related U.S. Application Data

(60) Provisional application No. 61/548,771, filed on Oct. 19, 2011.

(51) Int. Cl.
*F16L 3/12* (2006.01)
*A01M 7/00* (2006.01)
*F16L 3/22* (2006.01)

(52) U.S. Cl.
CPC .............. *A01M 7/0053* (2013.01); *F16L 3/221* (2013.01)
USPC ............................. 248/68.1; 248/49; 248/73

(58) Field of Classification Search
CPC ............. F16L 3/22; F16L 3/221; F16L 3/227; F16B 21/06; F16B 7/0406
USPC ........ 248/68.1, 49, 56, 65, 74.2, 74.5, 58, 62, 248/72–73; 403/326, 329, 292, 293, 305, 403/311, 359.5; 24/614–615; 285/305
See application file for complete search history.

(56) References Cited

U.S. PATENT DOCUMENTS

| | | | | |
|---|---|---|---|---|
| 318,343 | A * | 5/1885 | Baublits | 248/244 |
| 1,038,198 | A * | 9/1912 | Randall et al. | 211/205 |
| 1,612,959 | A * | 1/1927 | Zifferer | 248/59 |
| 1,787,734 | A | 1/1931 | Noble | |
| 2,336,604 | A * | 12/1943 | Edward et al. | 248/243 |
| 2,345,650 | A * | 4/1944 | Attwood | 403/21 |
| 2,375,513 | A * | 5/1945 | Bach | 248/59 |
| 2,846,169 | A * | 8/1958 | Sullivan | 248/62 |
| 2,880,949 | A * | 4/1959 | Fuss | 248/70 |
| 3,042,352 | A * | 7/1962 | Stamper | 248/68.1 |

(Continued)

OTHER PUBLICATIONS

Written Opinion and ISR for PCT/US2012/060930.

(Continued)

*Primary Examiner* — Terrell McKinnon
*Assistant Examiner* — Ingrid M Weinhold

(57) ABSTRACT

A configurable mounting system for supporting plumbing conduits on a boom arm of an agricultural sprayer includes a mounting base and an elongated platform portion. The platform portion has a front face, a rear face, and opposing side faces, the front face forming a base interface. The mounting system also has at least one conduit bracket having a conduit retaining portion and a bracket interface configured to slidingly engage and lock with the base interface of the mounting base. The mounting system also has an extension member mounted on the distal end of the mounting base. The extension member forms an extension to the platform portion increasing an area capable of receiving conduit brackets. The mounting system also has a horizontal spacer positionable between the mounting base and the conduit bracket that increases the separation between the mounting base and plumbing mount.

6 Claims, 13 Drawing Sheets

(56) References Cited

U.S. PATENT DOCUMENTS

| | | | | |
|---|---|---|---|---|
| 3,132,831 A * | 5/1964 | Stamper | 248/68.1 |
| 3,188,030 A * | 6/1965 | Fischer | 248/68.1 |
| 3,547,385 A * | 12/1970 | Kindorf et al. | 248/62 |
| 3,787,016 A * | 1/1974 | Laval, Jr. | 248/49 |
| 3,900,110 A * | 8/1975 | Soroka | 211/113 |
| 3,923,277 A * | 12/1975 | Perrault et al. | 248/49 |
| 4,032,096 A * | 6/1977 | Perrault et al. | 248/73 |
| 4,073,113 A * | 2/1978 | Oudot et al. | 52/710 |
| 4,199,070 A * | 4/1980 | Magnussen, Jr. | 211/60.1 |
| 4,244,542 A * | 1/1981 | Mathews | 248/49 |
| 4,306,697 A * | 12/1981 | Mathews | 248/68.1 |
| 4,391,546 A * | 7/1983 | Lyon | 403/189 |
| 4,445,656 A * | 5/1984 | Leitch et al. | 248/49 |
| 4,601,447 A * | 7/1986 | McFarland | 248/49 |
| 4,618,114 A * | 10/1986 | McFarland | 248/65 |
| 4,709,888 A * | 12/1987 | Cubit et al. | 248/73 |
| 4,830,531 A * | 5/1989 | Condit et al. | 403/348 |
| 4,960,253 A * | 10/1990 | Perrault et al. | 248/68.1 |
| 4,961,553 A * | 10/1990 | Todd | 248/62 |
| 5,154,385 A * | 10/1992 | Lindberg et al. | 248/225.11 |
| 5,730,399 A * | 3/1998 | Baginski | 248/58 |
| 5,799,907 A * | 9/1998 | Andronica | 248/62 |
| 5,855,342 A * | 1/1999 | Hawkins et al. | 248/68.1 |
| 6,061,984 A * | 5/2000 | Rose | 52/220.1 |
| 6,105,794 A * | 8/2000 | Bauer | 211/94.01 |
| 6,179,511 B1 * | 1/2001 | Gassler | 403/322.1 |
| 6,367,628 B2 * | 4/2002 | Hu | 206/377 |
| 6,378,811 B1 * | 4/2002 | Potter et al. | 248/68.1 |
| 6,402,096 B1 | 6/2002 | Ismert et al. | |
| 6,708,937 B2 * | 3/2004 | Thurman | 248/201 |
| 6,807,776 B2 * | 10/2004 | Girdwood et al. | 52/36.1 |
| 7,261,256 B2 * | 8/2007 | Pattie et al. | 244/129.1 |
| 7,484,697 B1 * | 2/2009 | Nelson | 248/62 |
| 7,780,122 B1 * | 8/2010 | Herbers | 248/59 |
| 7,828,251 B2 * | 11/2010 | Tollefson | 248/68.1 |
| 7,871,045 B2 * | 1/2011 | Moore et al. | 248/62 |
| 8,020,259 B2 * | 9/2011 | Ho et al. | 24/129 R |
| 8,376,290 B2 * | 2/2013 | Tollefson | 248/68.1 |
| 8,596,590 B2 * | 12/2013 | McCoy | 248/68.1 |
| 8,671,640 B1 * | 3/2014 | Thomas | 52/586.2 |
| 2004/0113024 A1 * | 6/2004 | Caveney et al. | 248/49 |
| 2007/0257157 A1 * | 11/2007 | Lu | 248/68.1 |
| 2009/0057498 A1 * | 3/2009 | Oh et al. | 248/68.1 |
| 2009/0146020 A1 * | 6/2009 | Moore et al. | 248/68.1 |
| 2011/0062293 A1 * | 3/2011 | McCoy | 248/73 |
| 2011/0132853 A1 * | 6/2011 | Drobot et al. | 211/42 |
| 2011/0294606 A1 * | 12/2011 | Llyod | 473/422 |
| 2011/0303456 A1 * | 12/2011 | Blanchard et al. | 174/480 |
| 2013/0192705 A1 * | 8/2013 | Allendorf et al. | 138/106 |
| 2013/0243523 A1 * | 9/2013 | De Jong et al. | 403/326 |

OTHER PUBLICATIONS

Office Action for U.S. Appl. No. 13/654,856 dated Apr. 24, 2014.
Office Action for U.S. Appl. No. 14/143,167 dated Jul. 7, 2014.

* cited by examiner

MODULAR BOOM MOUNTING SYSTEM FOR AGRICULTURE SPRAYER

CROSS-REFERENCE TO RELATED APPLICATION

This application claims priority to U.S. Provisional Application No. 61/548,771 filed Oct. 19, 2011, entitled "MODULAR BOOM MOUNTING SYSTEM FOR AGRICULTURAL SPRAYER."

BACKGROUND OF THE INVENTION

1. Field of Invention

This invention relates generally to a sprayer boom on a crop sprayer, and more particularly to modular bracket system for mounting plumbing to the sprayer boom.

2. Description of Related Art

The high crop yields of modern agribusiness require application of fertilizers, pesticides, and herbicides. Dispersing these chemicals onto high acreage fields requires specialized machines mounted on or towed by a vehicle. An example of such a machine is the self-propelled crop sprayer.

A common design for a self-propelled crop sprayer includes a dedicated chassis with a tank, boom arms, and nozzles connected to the boom arms. The tank contains fluid such as fertilizers, pesticides, and herbicides. Boom arms extend outward from the sides of the dedicated chassis. Boom plumbing contains supply lines and a plurality of nozzles spaced apart along the length of the boom arms at a standard spacing distance which corresponds to the spray pattern of the nozzles. In operation, as the crop sprayer crosses the field, fluid is pumped from the tank through the supply lines along the boom arms, and out through the nozzles. This allows the self-propelled sprayer to distribute the fluid along a relatively wide path. The length of conventional boom arms may vary from, for example, 6 meters (18 feet) up to 46 meters (150 feet), but smaller or longer booms are possible. The boom arms typically swing in for transport and out for operation.

Conventionally, pipes and hoses are supported along the boom arms with flat or bent metal brackets attached to the boom with u-bolts. Attachment of the pipes and hoses with the u-bolts can be time consuming. Based on the foregoing, it would be desirable to provide a configurable plumbing mounting system that reduces the amount of hardware, enhances functionality, durability, flexibility in mounting options and simplifies assembly.

OVERVIEW OF THE INVENTION

In one embodiment, the invention relates to a configurable plumbing mount for supporting plumbing conduits on a boom arm of an agricultural sprayer. The plumbing mount includes a mounting base mountable on a beam of the boom arm at its proximal end and having an elongated platform portion extending to a distal end. The platform portion has a front face, a rear face, and opposing side faces, the front face forming a base interface having a center groove running between two tracks. The tracks run from the distal end to a primary stop. One of the tracks has a secondary stop formed thereon located between the primary stop and the distal end of the mounting base. The plumbing mount also has at least one conduit bracket having a conduit retaining portion and a bracket interface configured to slidingly engage and lock with the base interface of the mounting base. The bracket interface has a center tongue with first and second skids on opposing sides on the center tongue. The conduit bracket is configured to slide on the mounting base by interlocking the center tongue with the center groove.

In one aspect, the bracket interface is configured to mount the conduit bracket on the mounting base in a first orientation with a first end of the center tongue initially inserted into the groove or in a second orientation with a second end of the center tongue initially inserted into the center groove. In the orientation with the first end inserted first, the skid without the ledge slides along the track with the secondary stop over the secondary stop until the tab overlays the primary stop and the detent snaps over the primary stop to lock the conduit bracket onto the mounting base. In the second orientation, the skid with the ledge slides along the track with the secondary stop and slides over the secondary stop until the ledge contacts the secondary stop and the detent snaps over the secondary stop to lock the conduit bracket onto the mounting base.

Another aspect of the invention is directed to a mounting bracket for supporting plumbing conduits on a boom arm of an agricultural sprayer. The mounting bracket has a variable diameter conduit retaining portion having a flexible tie strap and a saddle with a strap-receiving channel formed therein configured to allow for the passage of the tie strap through the saddle. The saddle has a vertex at or near its center and two legs extending from the vertex to form a generally V-shape. The saddle has an upper opening leading to the strap-receiving channel at an outer end of one leg that forms a first end of the channel and a lower opening at an opposite end of the channel at an outer end of the second leg. A front wall of the saddle has at least two cavities therein leading to the channel in between the upper and lower openings with a first of said at least two cavities on one side of the vertex and a second of said at least two cavities on the other side of the vertex.

The upper and lower openings and the at least two cavities provide for a plurality of paths for the tie strap. A large diameter path is provided by having the tie strap pass through the upper opening into the channel, out through the first cavity so that the tie strap passes on a conduit-facing side of the vertex of the saddle, back into the channel through the second cavity, and out through the lower opening. A medium diameter path is provided by having the tie strap pass through the upper opening, through the channel and through the lower opening. A small diameter is path provided by having the tie strap pass through the first cavity into the channel and through the second cavity.

Another aspect of the invention is directed to a configurable mounting system for supporting plumbing conduits on a boom arm of an agricultural sprayer. The mounting system includes a mounting base mountable on a beam of the boom arm at its proximal end and having an elongated platform portion extending to a distal end. The platform portion has a front face, a rear face, and opposing side faces, the front face forming a base interface having a center groove running between two tracks. The tracks run from the distal end to a primary stop. One of the tracks has a secondary stop formed thereon located between the primary stop and the distal end of the mounting base. The mounting system also has at least one conduit bracket having a conduit retaining portion and a bracket interface configured to slidingly engage and lock with the base interface of the mounting base. The bracket interface has a center tongue with first and second skids on opposing sides on the center tongue. The conduit bracket is configured to slide on the mounting base by interlocking the center tongue with the center groove. The mounting system also has an extension member mounted on the distal end of the mounting base. The extension member forms an extension to the platform portion increasing an area capable of receiving conduit brackets. The mounting system also has a horizontal spacer positionable between the mounting base and the conduit bracket. The horizontal spacer increases the horizontal separation between the mounting base and plumbing mount mounted on the horizontal spacer.

These and other features and advantages of this invention are described in, or are apparent from, the following detailed description of various example embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DESCRIPTION OF EXAMPLE EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
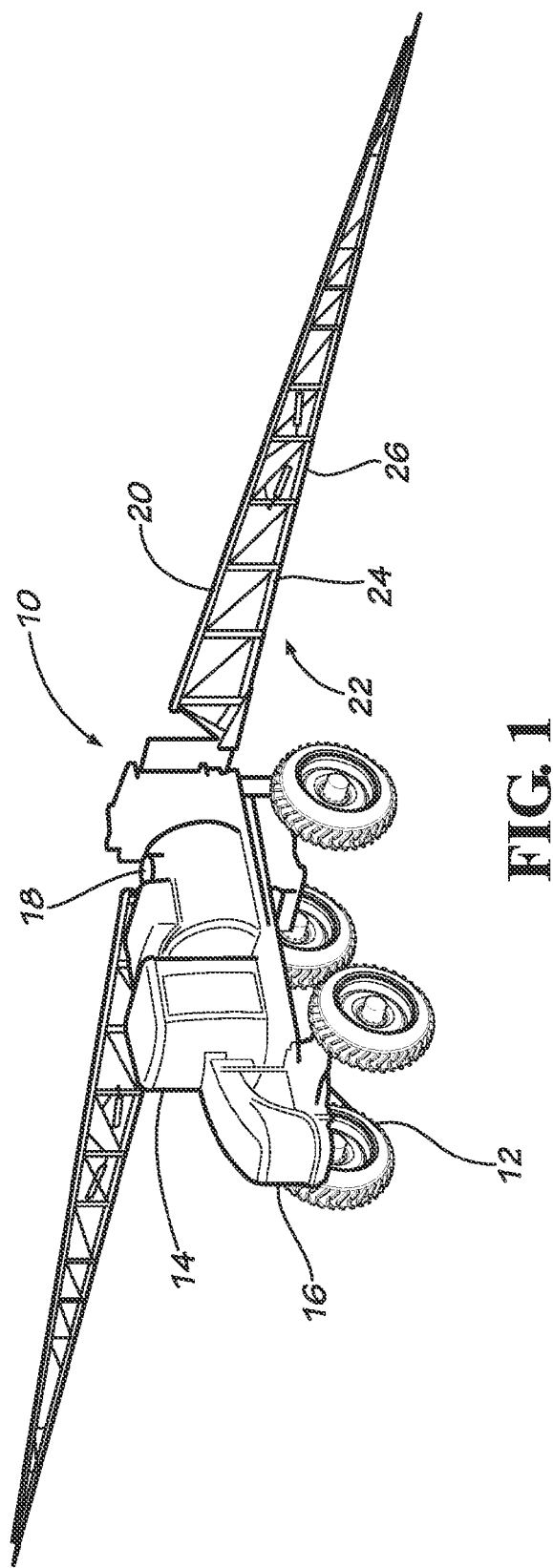
FIG. 1 is a perspective view of a crop sprayer.

FIG. 1 shows a crop sprayer 10 used to deliver chemicals to agricultural crops in a field. Crop sprayer 10 includes a chassis 12 and a cab 14 mounted on the chassis 12. Cab 14 may houses an operator and a number of controls for the crop sprayer 10. An engine 16 may be mounted on a forward portion of chassis 12 in front of cab 14 or may be mounted on a rearward portion of the chassis 12 behind the cab 14. The engine 16 may be commercially available from a variety of sources and may comprise, for example, a diesel engine or a gasoline powered internal combustion engine. The engine 16 provides energy to propel crop sprayer 10 and also may provide energy used to spray fluids from the crop sprayer 10.

The crop sprayer 10 further includes at least one storage tank 18 used to store fluid to be sprayed on the field. The fluid may include chemicals, such as but not limited to, herbicides, pesticides, and/or fertilizers. The at least one storage tank 18 may be mounted on chassis 12, either in front of or behind cab 14. Crop sprayer 10 may include more than one storage tank 18 to store different chemicals to be sprayed on the field. The stored chemicals may be dispersed by crop sprayer 10 one at a time or different chemicals may be mixed and dispersed together in a variety of mixtures.

Boom arms 20 extending from each side of the crop sprayer 10 are used to distribute the fluid from the at least one tank 18 over a wide swath as the crop sprayer 10 is driven through the field. The boom arms 20 extending from either side of the crop sprayer 10 are desirably substantially identical but mirror images of each other. The fluid is conveyed by a fluid supply system 22 using pipes and/or hoses, broadly conduits, 24 to various spray nozzles (not shown) spaced along the boom arms 20. As is known in the art, the fluid supply system 22 includes at least one pump (not shown) configured to pumps fluid from the at least one tank 18 through the various hoses and/or pipes 24 to the spray nozzles (not shown). An operator of the crop sprayer 10 may use controls (not shown) located in the cab 14 to control movement of the boom arm 20 and to turn on and to shut off the fluid flow to the plurality of spray nozzles. Each boom arm 20 has a frame containing one or more tubular beams 26 that extend from the crop sprayer 10 to the distal end of the boom arm 20. According to the invention, conduits 24 are supported along beams 26 of the boom arms 20 using a configurable mounting system 30 as will be described below.

Figure 2:
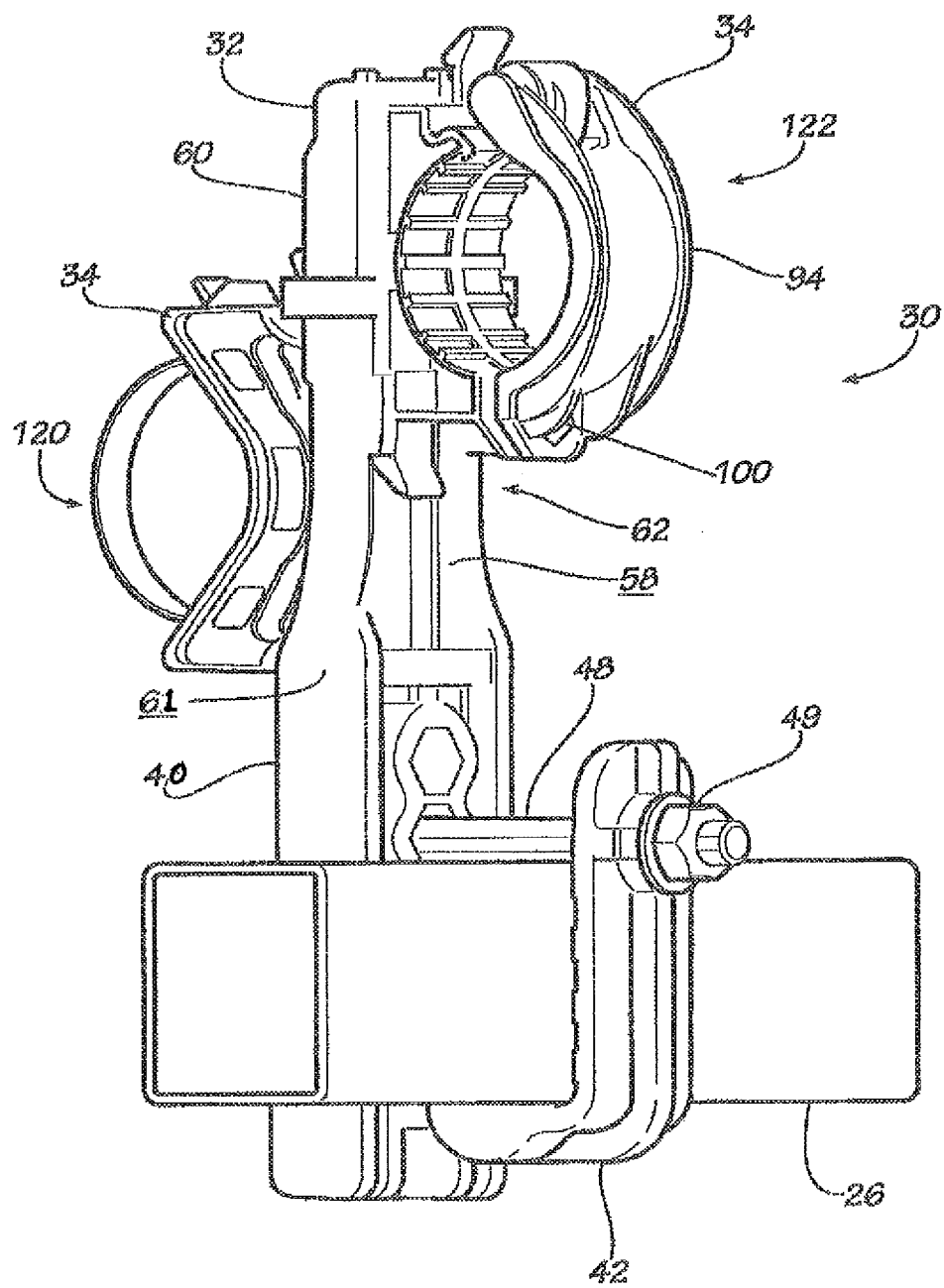
FIG. 2 is a perspective view of a portion of a boom arm on the crop sprayer of FIG. 1 showing a plumbing mount of a configurable mounting system according to an embodiment of the invention.

Turning now to FIG. 2, the configurable mounting system 30 includes a plurality of plumbing mounts 32 spaced along the beam 26 to support the conduits of the fluid supply system 22. Since crop sprayers 10 are used in different conditions and on different types of crop, the fluid supply system 22 carried on one crop sprayer 10 may be different than the fluid supply system 22 carried on another crop sprayer 10 designed for use in different conditions. Therefore, the plumbing mounts 32 of the configurable mounting system 30 have a modular design for receiving conduit brackets 34 that support the different type and diameter of conduits 24 used in fluid supply systems 22 on different crop sprayers 10.

Figure 3:
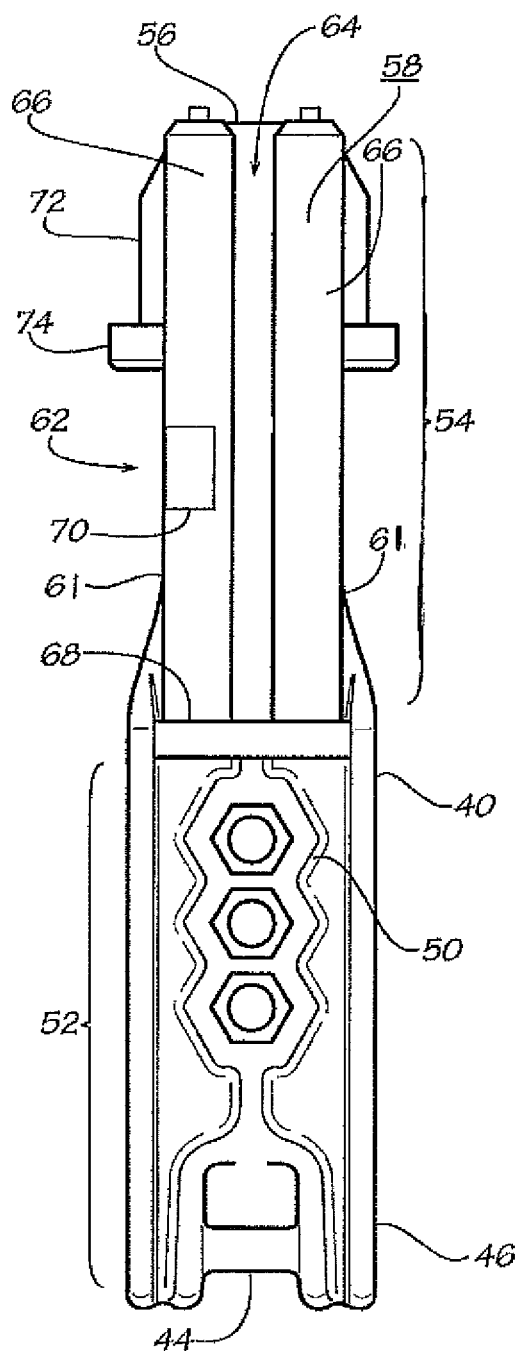
FIG. 3 is an enlarged view of a mounting base of the plumbing mount of FIG. 2.

The plumbing mount 32 includes a mounting base 40 attachable to the beam 26. In the illustrated embodiment, the mounting base 40 receives an L-shaped clasp arm 42 that hooks around the square tubing of the beam 26. Desirably, the clasp arm 42 is pivotally received on the mounting base 40 on a cylindrical hinge point 44 at a proximal end 46 of the mounting base 40 as best seen in FIG. 3. A clamping bolt 48 and nut 49 connect end of the clasp arm 42 to the mounting base 40 to lock the mounting base 40 on the beam 26. Desirably, the mounting base 40 has a molded-in hexagon 50 in a beam-mounting portion 52 of the mounting base 40 used for capturing the head of the mounting bolt 48 to aid in assembly. In the illustrated embodiment, a plurality molded-in hexagons 50 are provided along the beam-mounting portion so the mounting base 40 can be used with clasp arms 42 of different sizes so as to clamp on beams 26 of different sizes. However, one skilled in the art will understand that other means for attaching the mounting base 40 to the beam 26 may be used using sound engineering judgment without departing from the scope of the invention.

Figure 4:
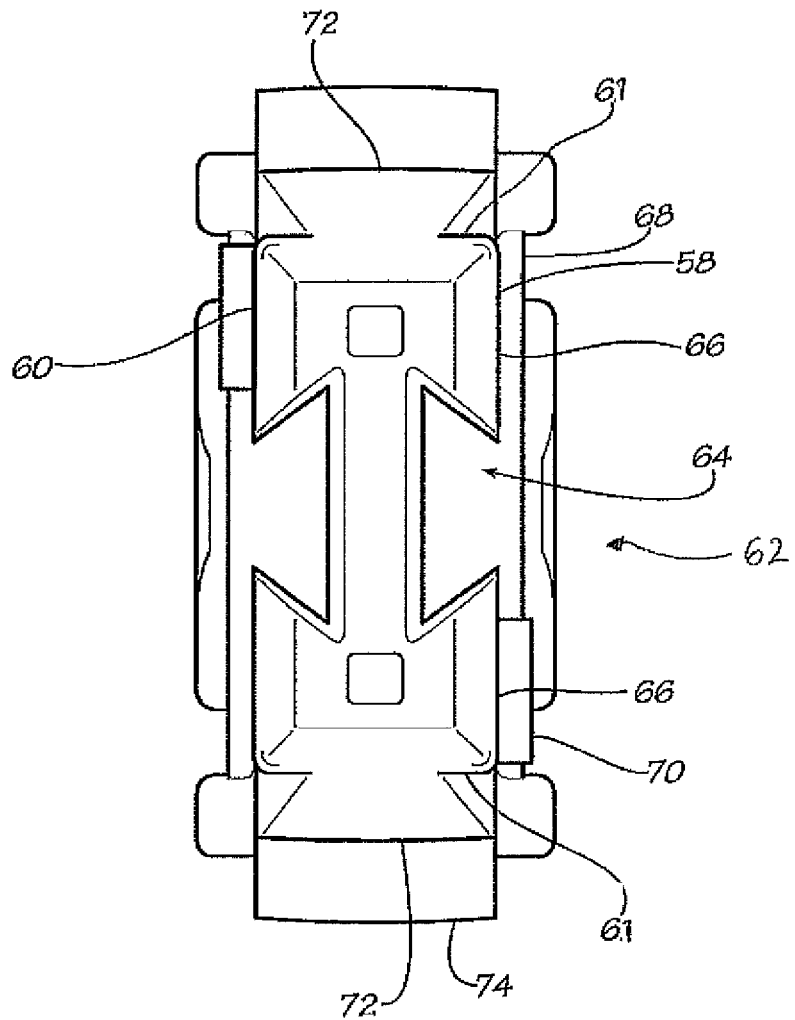
FIG. 4 is a top view of the mounting base of FIG. 3.

The mounting base 40 has an elongated platform portion 54 adjacent the beam-mounting portion 52 extending to a distal end 56 of the mounting base 40. The platform portion 54 is configured to receive one or more conduit brackets 34 used to support conduits 24. The platform portion 54 has a front face 58, a rear face 60, and opposing side faces 61. Desirably, the front and rear faces 58, 60 are substantially identical such that the mounting base 40 can receive conduit brackets 34 of the mounting base. As the front and rear faces 58, 60 are identical in the illustrated embodiment, only the front face 58 will be described herein. The platform portion 54 has a base interface 62 that interacts with a bracket interface 63 on conduit brackets 34 to removably lock the conduit brackets 34 on the mounting base 40. The base interface 62 includes a center groove 64 running between tracks 66 in the platform portion 54. The center groove 64 and tracks 66 run from the distal end 56 of the mounting base 40 to a primary stop 68 located at the boundary between the platform portion 54 and the beam-mounting portion 52 of the mounting base 40. One of the tracks 66 has a secondary stop 70 formed thereon located between the primary stop 68 and the distal end 56 of the mounting base 40. In one embodiment, the center groove 64 has a dovetail shape as best seen in FIG. 4. Side faces 61 have side tongues 72 extending therefrom in an upper part of the platform portion 54. Side tongues 72 extend from the distal end 56 of the mounting base 40 to a block 74. In the illustrated embodiment, the side tongues 72 have a dovetail shape.

Figure 5:
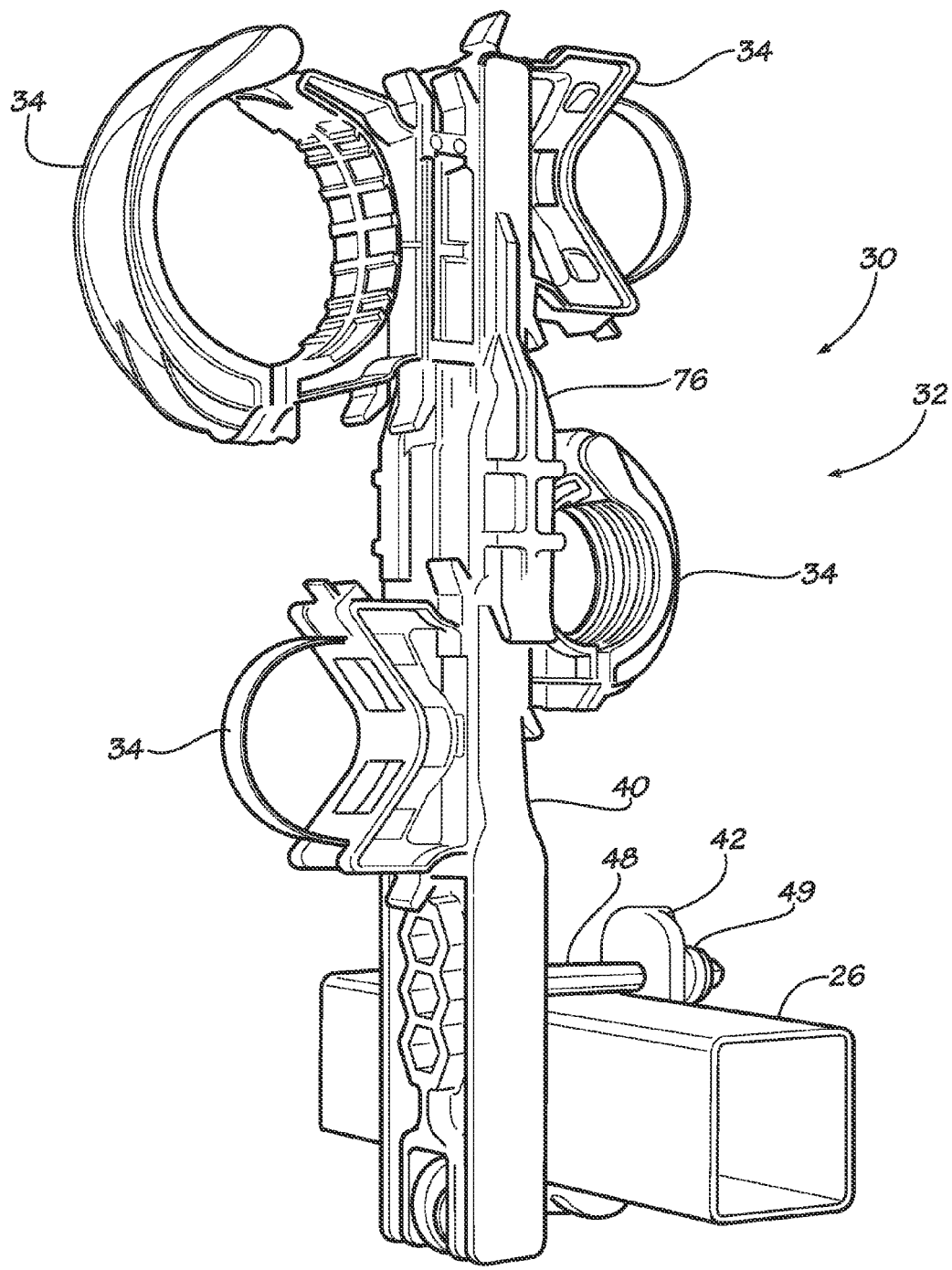
FIG. 5 is a perspective view a plumbing mount of the configurable mounting system having an extension member.
Figure 6:
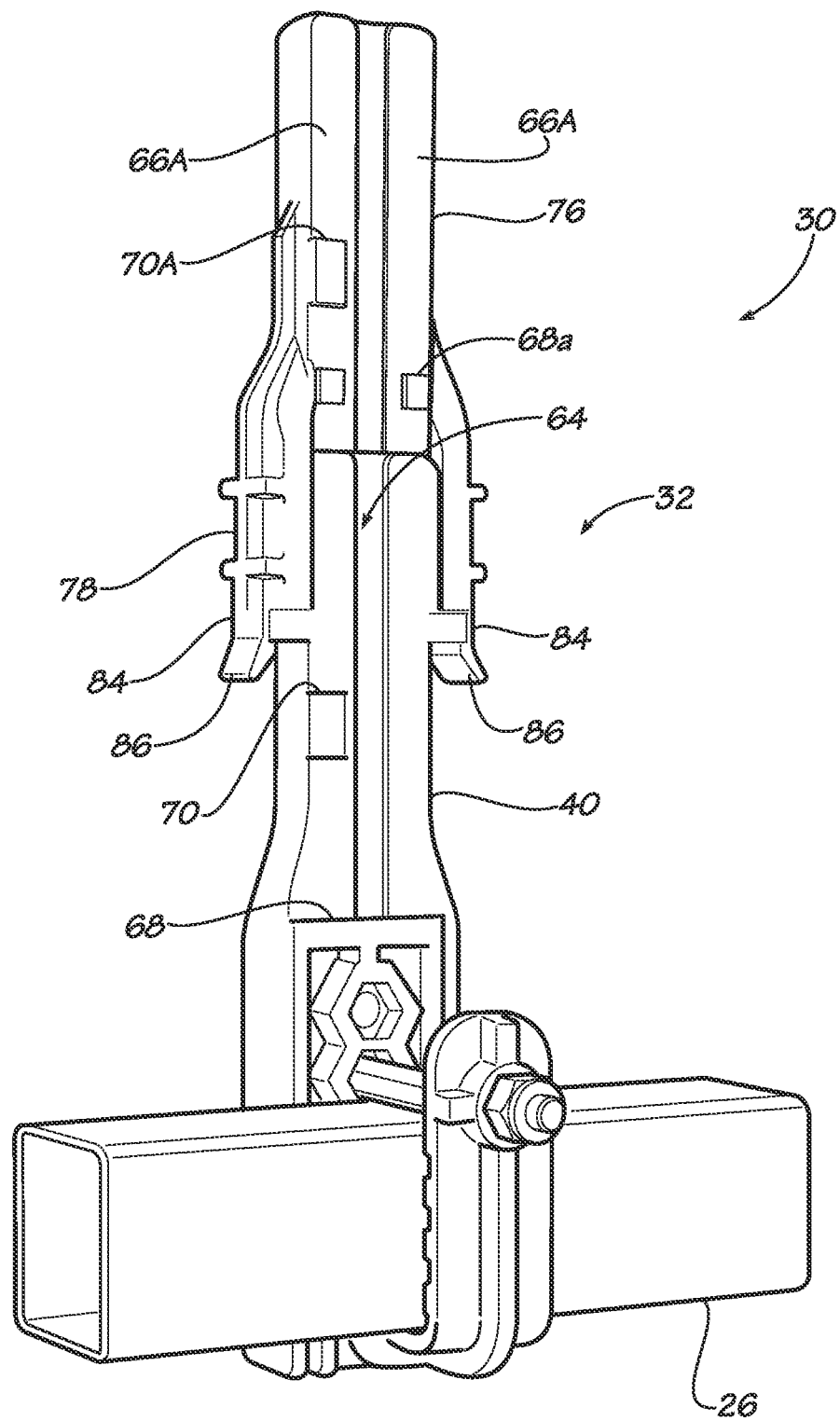
FIG. 6 is a perspective view of the plumbing mount of FIG. 5 without the plumbing brackets.
Figure 7:
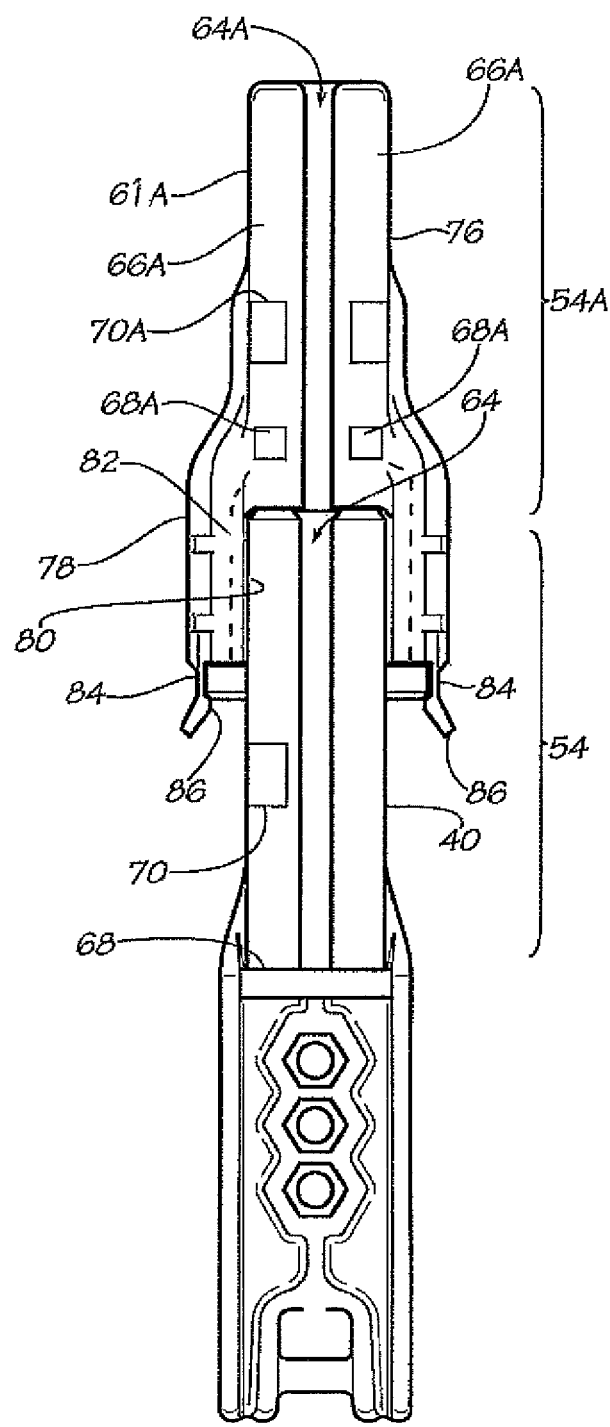
FIG. 7 is a view of the mounting base and the extension member of the plumbing mount of FIG. 5.

Turning now to FIGS. 5-7, the mounting base 40 is selectively capable of receiving an extension member 76 to increase the available area capable of receiving conduit brackets 34. FIG. 5 illustrates mounting base 40 with the extension member 76 attached thereto having four conduit brackets 34 supported thereon. Thus, it can be seen that the extension member 76 increases the capacity of the plumbing mount 32 of the configurable mounting system 30 for applications where additional conduits 24 need to be supported on the beam 26. The extension member 76 has a platform portion 54A with a pair of connection legs 78 extending from side faces 61A. Interior surfaces 80 of the legs 78 have grooves 82 formed therein. The extension member 76 fits on the distal end 56 of the mounting base 40 with the legs 78 straddling the distal end 56 of the mounting base 40 and by interlocking the side tongues 72 on the side faces 61 of the mounting base 40 into the grooves 82 on the interior surfaces 80 of the legs 78. Each of the ends of the legs 78 has a tab 84 with a detent 86 that snaps over the block 74 at the end of the side tongue 72 to lock the extension member 76 onto the mounting base 40. Desirably, tabs 84 are flexible such that they may be pulled out to release the detents 86 when removal of the extension member 76 from the mounting base 40 is desired.

As can be seen in FIGS. 6 and 7, the platform portion 54A of the extension member 76 is substantially similar to the platform portion 54 of the mounting base 40 such that a center groove 64A in the extension member 76 aligns with the center groove 64 of the mounting base 40. Additionally, tracks 66A of the extension member 76 align with the tracks 66 of the mounting base 40. Each of the tracks 66A has a primary stop 68A and one of the tracks 66A of the extension member 76 has a secondary stop 70A substantially similar to the secondary stop 70 on one of the tracks 66 of the mounting base 40.

Figure 8:
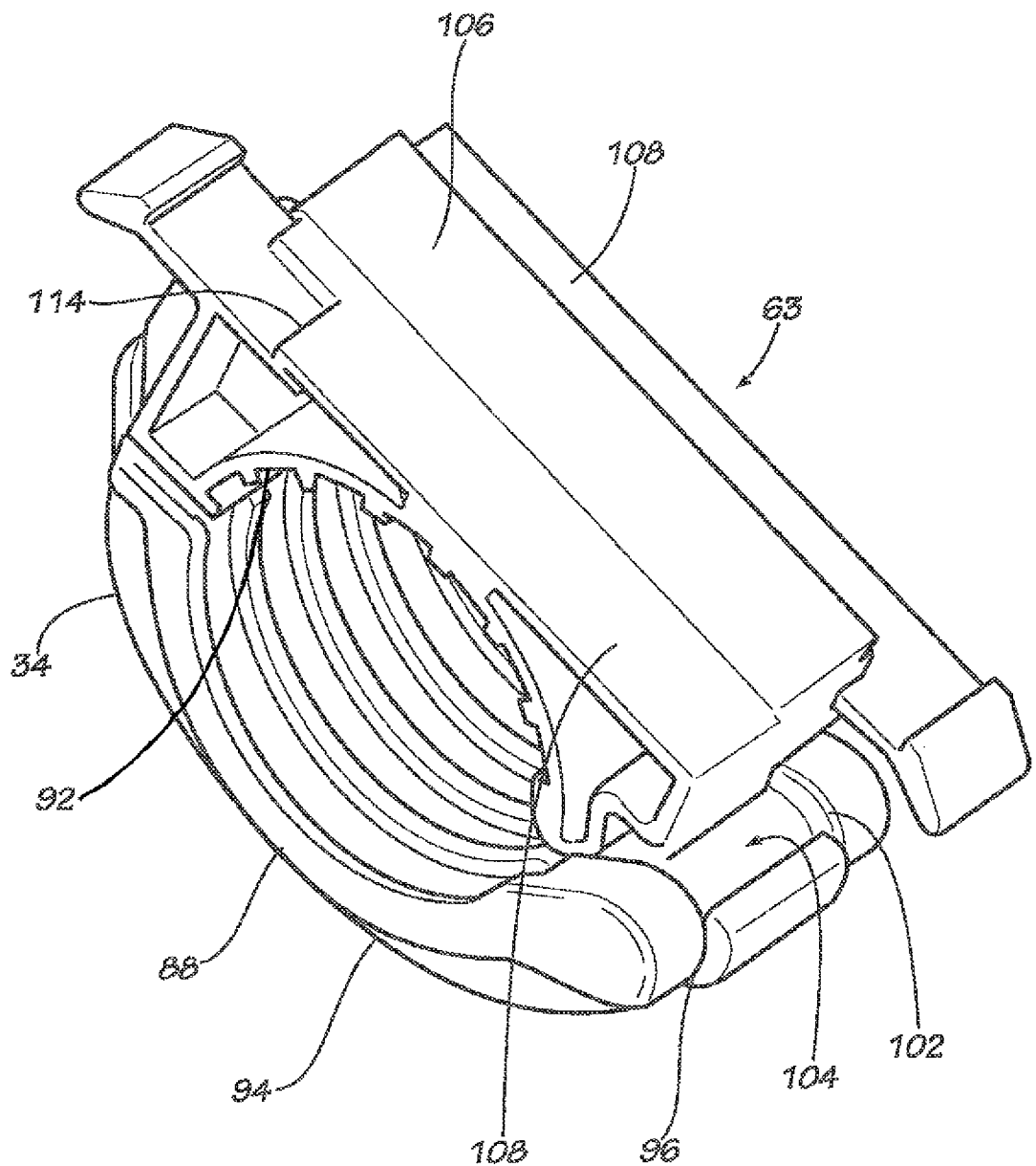
FIG. 8 is a perspective view a conduit bracket of the configurable mounting system of FIG. 2.
Figure 9:
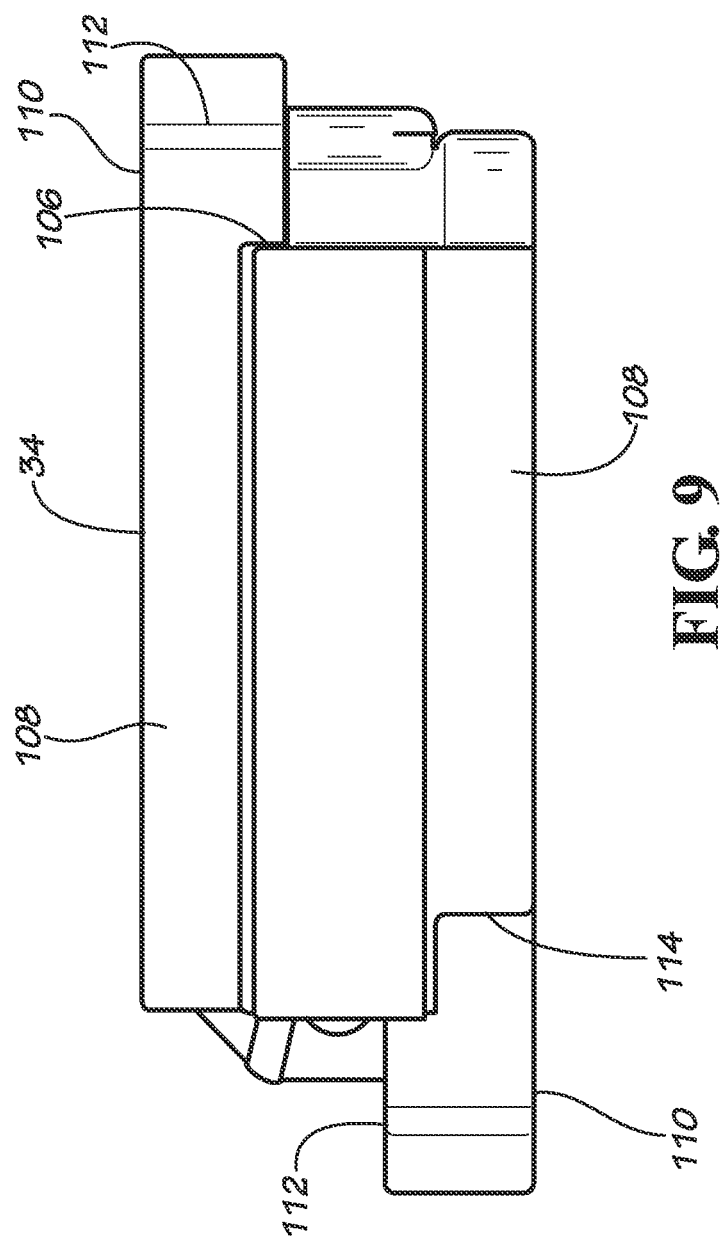
FIG. 9 is an end view of the conduit bracket of FIG. 8.
Figure 10:
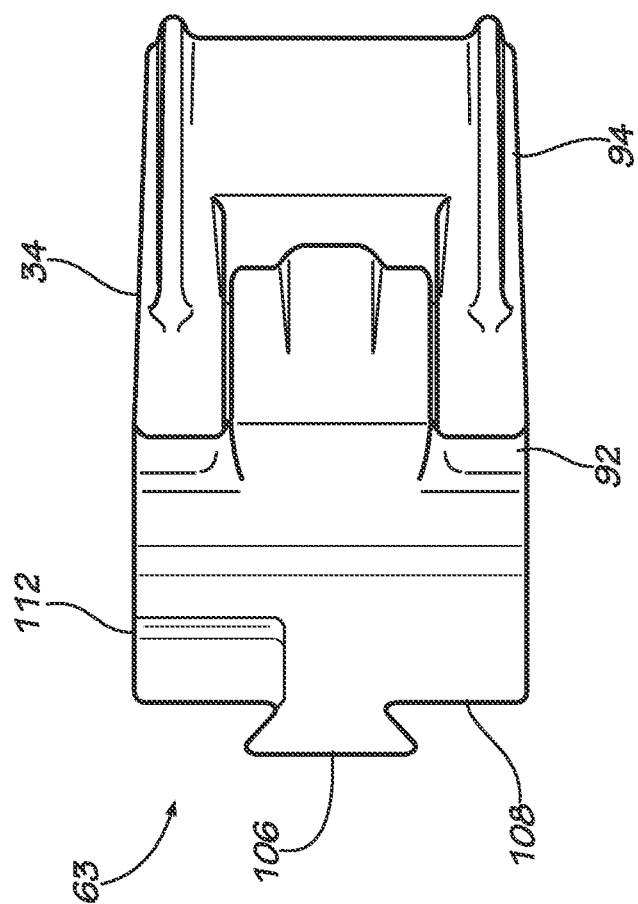
FIG. 10 is a top view of the conduit bracket of FIG. 8.

Turning now to FIGS. 8-10, one embodiment of the conduit bracket 34 particularly suited for holding pipes has conduit retaining portion 88 and the bracket interface 63. The bracket interface 63 is configured to slidingly engage and lock with the base interface 62 of the mounting base 40 (FIGS. 3 and 4). The conduit retaining portion 88 has a saddle 92 and a hinged cover 94 that is mounted at one end of the saddle 92 with a pivot mount 96 and is configured to attach to the saddle 92 with a clamping bolt (not shown) passing through a bolt-receiving hole 100 (FIG. 2) at its opposing end. In the illustrated embodiment, the pivot mount 96 includes a pivot shaft 102 on the hinged cover 94 that snap fits into hooked trough 104. However, one skilled in the art will understand that the conduit retaining portion 88 may have clamping bolts (not shown) at both ends of the cover 94, or may use other conduit retaining means using sound engineering judgment. Desirably, conduit facing surfaces of the hinged cover 94 and saddle 92 have anti-rotation ribs and anti-slip ridges to reduce movement of the conduit 24.

The bracket interface 63 has a center tongue 106 with first and second skids 108 on opposing sides on the center tongue 106. Each skid 108 has a tab 110 with a locking detent 112 at one end thereof. The first skid 108 has a ledge 114 formed thereon running a portion of the length of the skid 108 and terminating before reaching the tab 110 and locking detent 112. In the illustrated embodiment best seen in FIG. 10, the center tongue 106 has a dovetail shape that corresponds to the dovetail shape of the center groove 64 in the platform portion 54 of the mounting base 40. However, one skilled in the art will understand that the center groove 64 and center tongue 106 may have other interlocking shapes, such a T-shaped groove and tongue or an obround and groove without departing from the scope of the invention. The conduit bracket 34 slides on the mounting base 40 by interlocking the center tongue 106 into the center groove 64. Of course one skilled in the art will understand that other interlocking shapes for the center tongue 106 and center groove 64 may be used without departing from the scope of the invention. Additionally, one skilled in the art will understand that the center tongue 106 may be on the mounting base 40 and the center groove 64 may be on the conduit bracket 34.

In the example embodiment, the bracket interface 63 is configured to mount the conduit bracket 34 on the mounting base 40 with either the pivot mount 96 on top or with the bolt-receiving hole 100 on top. In the orientation with the bolt-receiving hole 100 on top, the skid 108 without the ledge 114 slides along the track 66 with the secondary stop 70. The skid 108 slides over the secondary stop 70 until the tab 110 overlays the primary stop 68 and the detent 112 snaps over the primary stop 68 to lock the conduit bracket 34 onto the mounting base 40. Desirably, the tab 110 is flexible such that it may be pulled out to release the detent 112 when removal of the conduit bracket 34 from the mounting base 40 is desired. In the orientation with the pivot mount 96 on top, the skid 108 with the ledge 114 slides along the track 66 with the secondary stop 70. The skid 108 slides over the secondary stop 70 until the ledge 114 contacts the secondary stop 70 and the detent 112 snaps over the secondary stop 70 to lock the conduit bracket 34 onto the mounting base 40. When the bracket interface 63 interacts and locks with the primary stop 68, the conduit bracket 34 is mounted in a first station 120 (FIG. 2) on the mounting base 40. When the bracket interface 63 interacts and locks with the secondary stop 70, the conduit bracket 34 is mounted in a second station 122 (FIG. 2) on the mounting base 40 that is offset vertically from the first station 120. FIG. 1 illustrates a conduit bracket 34 mounted on the second station 122 on the front face 58 of the mounting base 40 and a second conduit bracket 34 mounted in the first station 120 on the rear face 60 of the mounting base 40. Thus, it can be seen that the operator may select the vertical position of the conduit bracket 34 on the mounting base 40 with the orientation of the conduit bracket 34. Of course, one skilled in the art will understand that the specific conduit retaining portion 88 used in the description of the interaction of the bracket interface 63 with the base interface 62 is for example purposes only and is to help describe the possible orientations of the bracket interface 63 relative the base interface 62.

Figure 11:
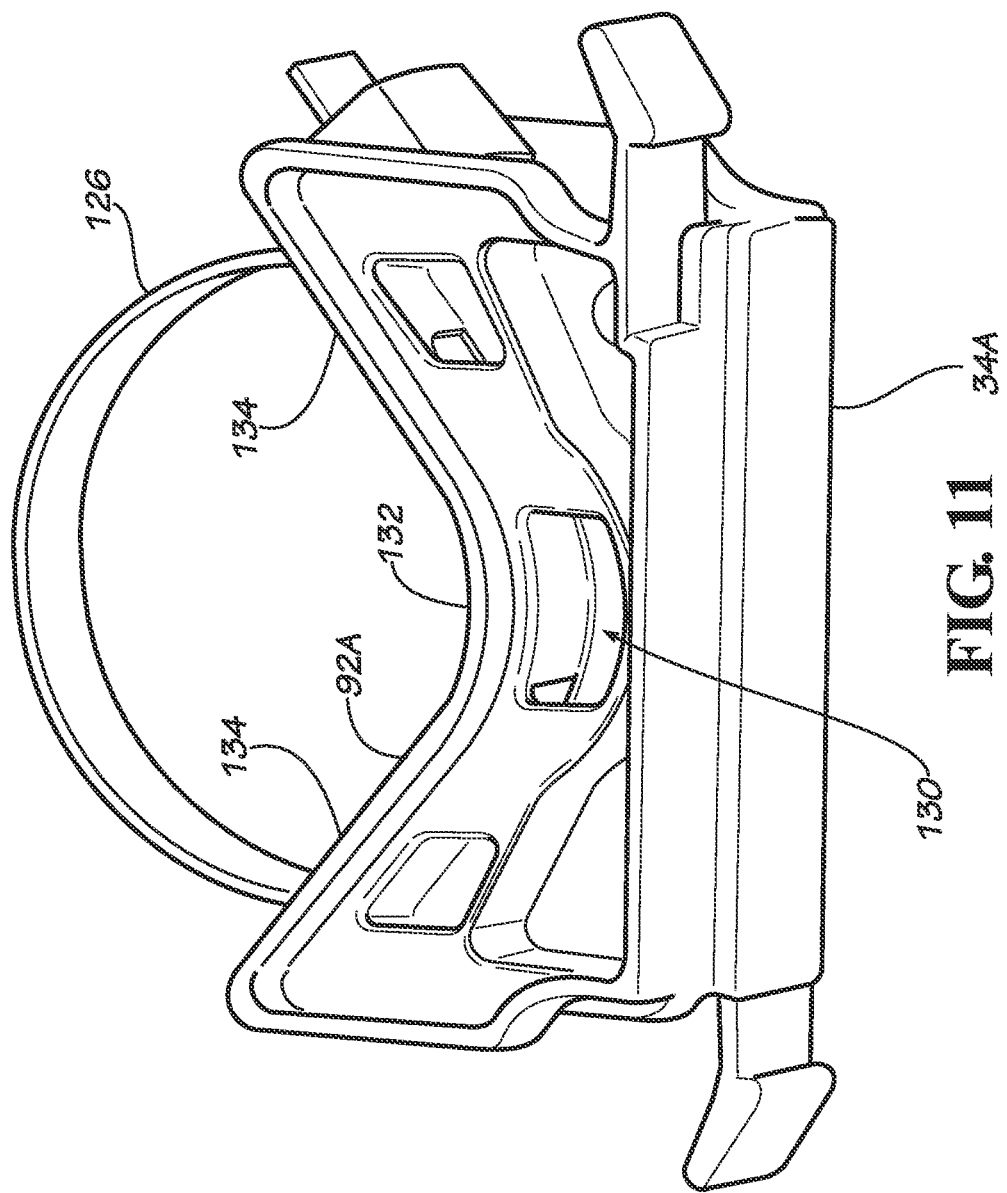
FIG. 11 is a perspective view another embodiment of a conduit bracket of the configurable mounting system of FIG. 2.
Figure 12:
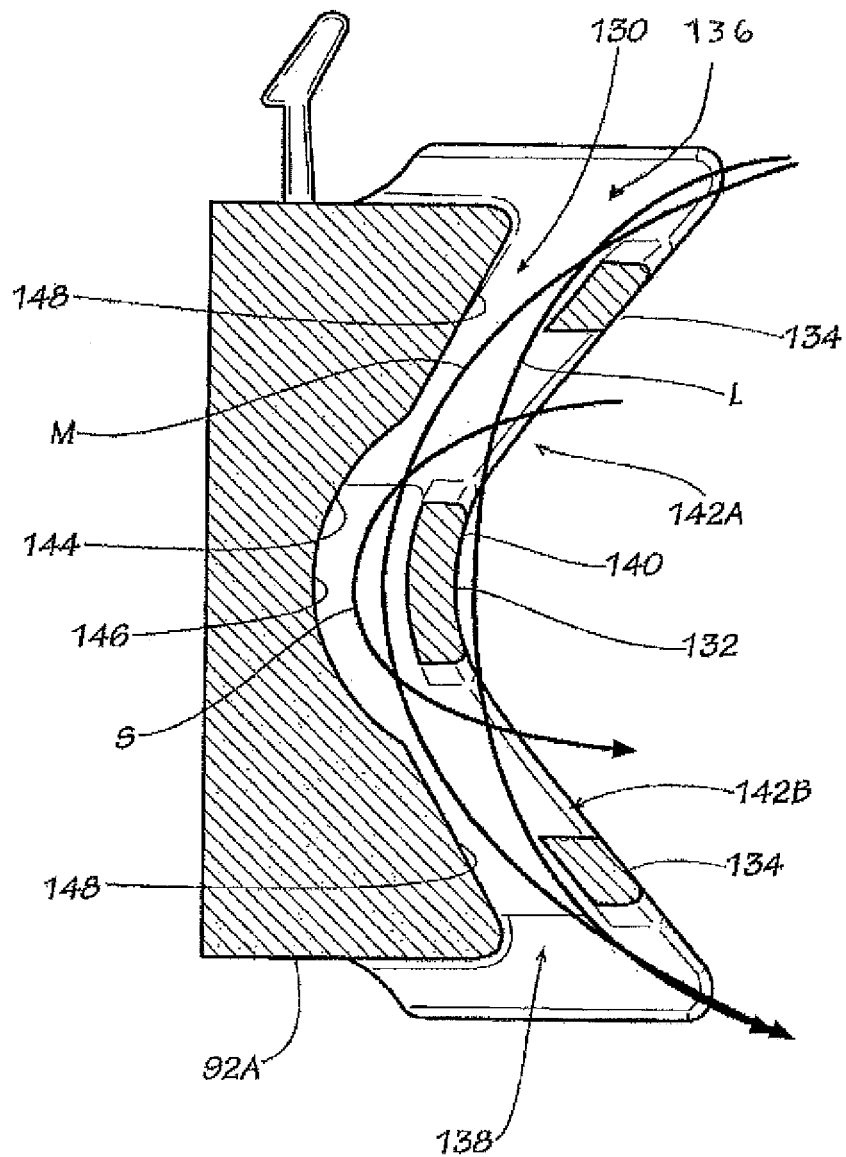
FIG. 12 is a sectional view of the conduit bracket of FIG. 11.

Turning now to FIGS. 11-12, an embodiment of a variable diameter conduit bracket 34A is illustrated. The variable diameter conduit bracket 34A has a bracket interface 63 configured to slidingly engage and lock with the base interface 62 of the mounting base 40 identical to bracket interface 63 of the conduit bracket 34. A conduit retaining portion 88 of the variable diameter conduit bracket 34A has a flexible tie strap 126 and a saddle 92A with a strap-receiving channel 130 formed therein. The tie strap 126 may be of any conventional design known to those skilled in the art and need to be described in detail. The strap-receiving channel 130 allows for the passage of the tie strap 126 through the saddle 92A. The saddle 92 has a vertex 132 at or near its center and two legs 134 extending from the vertex 132 in a generally V-shape. A conduit 24 supported by the variable diameter conduit bracket 34A is held in the saddle 92A by the tie strap 126 such that the lower of the two legs 134 supports the weight of the conduit 24 and the tie strap 126 is primarily in tension pulling the conduit 24 toward the vertex 132 of the saddle 92A. The saddle 92A has an upper opening 136 leading to the strap-receiving channel 130 at an outer end of one leg that forms a first end of the channel 130 and a lower opening 138 at an opposite end of the channel 130 at an outer end of the second leg. A front wall 140 of the saddle 92 has a plurality of cavities 142A, 142B therein leading to the channel 130 in between the upper and lower openings 136, 138. In the illustrated embodiment, two cavities 142A, 142B are provided in the front wall 140, the first cavity 142A on one side of the vertex 132 and the second cavity 142B on the other side of the vertex 132. However, one skilled in the art will understand that more than two cavities 142A, 142B may be used.

The upper and lower openings 136, 138 and the plurality of cavities 142A, 142B provide for a multitude of paths for the tie strap 126 to pass through in order to accommodate differing diameters of conduits 24. As best seen in FIG. 12, a large diameter path L is provided by having the tie strap 126 pass through the upper opening 136 into the channel 130, out through the first cavity 142A so that the tie strap 126 passes on the conduit-facing side of the vertex 132 of the saddle 92, back into the channel 130 through the second cavity 142B, and out through the lower opening 138. A medium diameter path M is provided by having the tie strap 126 pass through the upper opening 136, through the channel 130 and through the lower opening 138. A small diameter path S is provided by having the tie strap 126 pass through the first cavity 142A into the channel 130 and through the second cavity 142B. One skilled in the art will understand that additional cavities 142A, 142B may be provided between the upper and lower openings 136, 138 to provide additional path options. The shape of the saddle 92A and the number of guide paths for the tie strap 126 enable the variable diameter conduit bracket 34A to be used for conduits 24 having a range of diameters.

Desirably, the back wall 144 of the channel 130 has a shape configured to feed the tie strap 126 in the desired path, L, M or S. The back wall 144 has a center section 146 with a curved surface to deflect a tie strap 126 inserted through one of the cavities 142A, 142B out of the other cavity 142A, 142B. The back wall 144 has outer sections 148 with straight surfaces sloped to guide the tie strap 126 through the channel 130 and out the opposite opening 136 or 138.

Figure 13:
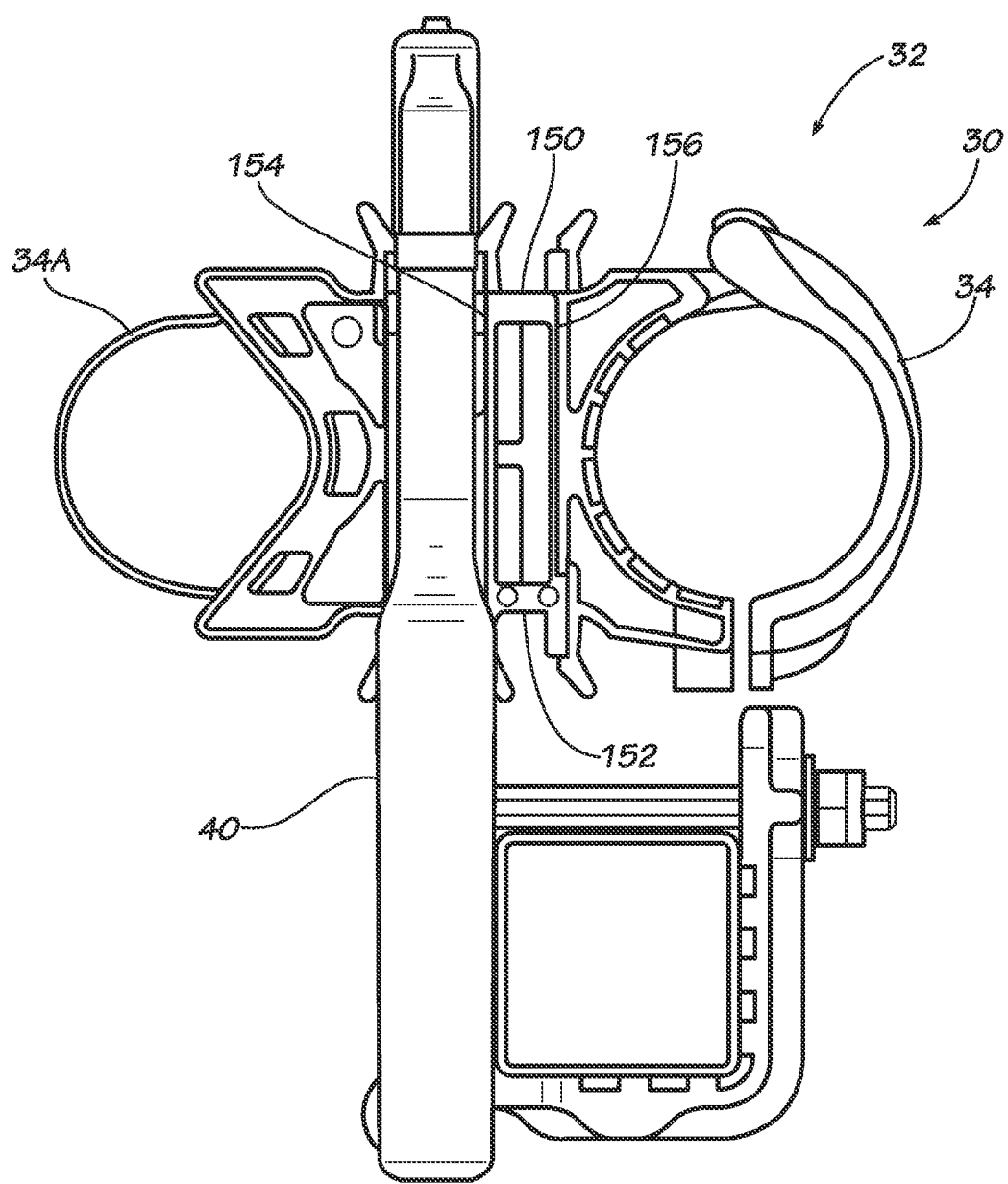
FIG. 13 is a side view of a plumbing mount of the configurable mounting system having a horizontal spacer between the mounting base and the conduit bracket.

Turning now to FIG. 13, a horizontal spacer 150 can be mounted on the plumbing mount 32 between the mounting base 40 and the conduit bracket 34 to increase the horizontal separation between the conduit 24 and the mounting base 40.

As seen, the horizontal spacer 150 has a body 152 with an interface 154 substantially identical with the bracket interface 63 on a first side that mounts on the base interface 62 of the mounting base 40. A second side of the body has an interface 156 substantially identical with the base interface 62. Thus, the conduit bracket 34, 34A can be mounted on the second side of the horizontal spacer 150 in substantially the same way as described above. Therefore, the horizontal spacer 150 can be used to vary the horizontal spacing of the conduit 24 with respect to the mounting base 40 or other conduits 24 on the plumbing mount 32.

Thus, the plumbing mount 32 of the configurable mounting system 30 can be attached to the beam 26 of the crop sprayer 10 and outfitted with conduit brackets 34, 34A that can be positioned at different stations vertically and horizontally with respect to the mounting base 40. The conduit brackets 34, 34A can be installed in different vertical positions by switching the orientation of the conduit bracket 34, 34A or by adding an extension member 76 to the mounting base 40. The conduit brackets 34, 34A can be installed in different horizontal positions by using horizontal spacers 150 between the mounting base 40 and the conduit brackets 34. Additionally, conduit brackets 34 of different sizes or a variable diameter conduit bracket 34A can be used on the plumbing mount 32 based on the sizes of the conduits in the fluid distribution system 22.

While this invention has been described in conjunction with the specific embodiments described above, it is evident that many alternatives, combinations, modifications and variations are apparent to those skilled in the art. Accordingly, the preferred embodiments of this invention, as set forth above are intended to be illustrative only, and not in a limiting sense. Various changes can be made without departing from the spirit and scope of this invention.

What is claimed is:

1. A configurable mounting system for supporting plumbing conduits on a boom arm of an agricultural sprayer, the mounting system comprising:

a mounting base mountable on a beam of the boom arm at a proximal end of the mounting base, the mounting base having an elongated platform portion extending to a distal end of the mounting base, the platform portion having a front face, a rear face, and opposing side faces, the front face forming a base interface, wherein said side faces each have a side tongue extending therefrom in an upper part of the platform portion, each of said side tongues extending from the distal end of the mounting base to a block;

at least two conduit brackets, each conduit bracket having a conduit retaining portion and a bracket interface;

an extension member mounted on the distal end of the mounting base, said extension member forming an extension to the platform portion increasing an area capable of receiving conduit brackets, wherein said extension member has a pair of legs having grooves that receive the side tongues of the mounting base;

wherein the base interface comprises a center groove running between two tracks, the tracks running from the distal end of the mounting base to a primary stop, wherein one of the tracks has a secondary stop formed thereon located between the primary stop and the distal end of the mounting base;

wherein each bracket interface comprises a center tongue with first and second skids on opposing sides of the center tongue, the center tongue configured to interlock with the center groove of the base interface; and a horizontal spacer configured to be positioned between the mounting base and a first conduit bracket of the at least two conduit brackets, wherein the horizontal spacer increases the horizontal separation between the mounting base and the first conduit bracket.

2. The configurable mounting system of claim 1 wherein the side tongues have a dovetail shape.

3. The configurable mounting system of claim 1 wherein the extension member fits on the distal end of the mounting base with the legs straddling the distal end of the mounting base with the side tongues of the mounting base fitted into the grooves on interior surfaces of the legs.

4. The configurable mounting system of claim 3 wherein an end of each of the legs has a tab with a detent that snaps over the block at the end of the side tongue to lock the extension member onto the mounting base.

5. The configurable mounting system of claim 4 wherein the tabs are flexible such that they may be pulled out to release the detents enabling removal of the extension member from the mounting base.

6. The configurable mounting system of claim 1 wherein a center groove in the extension member aligns with the center groove of the mounting base and tracks of the extension member align with the tracks of the mounting base.

* * * * *